US008626784B2

(12) United States Patent
Beaudreau et al.

(10) Patent No.: US 8,626,784 B2
(45) Date of Patent: Jan. 7, 2014

(54) MODEL-BASED SEARCHING

(75) Inventors: Scott J. Beaudreau, Redmond, WA (US); Derrick L. Connell, Bellevue, WA (US); James P. Dierkes, Jr., Frisco, TX (US); Brian MacDonald, Bellevue, WA (US); Brian Scott Otto, Valencia, CA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 12/485,907

(22) Filed: Jun. 16, 2009

(65) Prior Publication Data

US 2010/0287175 A1 Nov. 11, 2010

Related U.S. Application Data

(60) Provisional application No. 61/177,250, filed on May 11, 2009.

(51) Int. Cl.
*G06F 17/30* (2006.01)
(52) U.S. Cl.
USPC .......................................................... 707/759
(58) Field of Classification Search
USPC .......................................................... 707/759
See application file for complete search history.

(56) References Cited

U.S. PATENT DOCUMENTS

| 7,836,044 | B2* | 11/2010 | Kamvar et al. | 707/713 |
| 2005/0154730 | A1* | 7/2005 | Miller et al. | 707/9 |
| 2005/0216451 | A1* | 9/2005 | Enzler et al. | 707/3 |
| 2005/0283468 | A1* | 12/2005 | Kamvar et al. | 707/3 |
| 2008/0059456 | A1 | 3/2008 | Chowdhury | |
| 2008/0104061 | A1 | 5/2008 | Rezaei | |
| 2008/0133585 | A1 | 6/2008 | Vogel | |
| 2008/0140657 | A1 | 6/2008 | Azvine | |
| 2008/0154877 | A1* | 6/2008 | Joshi et al. | 707/5 |
| 2008/0275864 | A1 | 11/2008 | Kim | |
| 2008/0313142 | A1 | 12/2008 | Wang | |

(Continued)

OTHER PUBLICATIONS

Dou Shen, "Learning-Based Web Query Understanding," Jun. 2007, Hong Kong, HKUST Library, A Thesis Submitted to The Hong Kong University of Science and Technology in Partial Fulfillment of the Requirements for the Degree of Doctor of Philosophy in Computer Science and Engineering, 175 pp. http://lbxml.ust.hk/th_imgo/b989690.pdf.

(Continued)

*Primary Examiner* — Hung Q Pham
(74) *Attorney, Agent, or Firm* — Shook, Hardy & Bacon L.L.P.

(57) ABSTRACT

Computer-readable media and methods for model-based searching to provide search results of relevance to a search topic are provided. A model describing a search framework for generating a plurality of search queries is provided. A number of search topics are identified and attributes are assigned to each search topic. Attribute data elements and values are provided to describe each to the assigned attributes for each search topic. The attributes inform the search framework in order to compile a plurality of search queries for the search topic. A search term is received from a user and a corresponding search topic is identified. The plurality of search queries are executed to obtain search results for the corresponding search topic. The search queries may be pre-executed and the search results cached in a computer memory for later retrieval. The search results are organized based on the model and are presented to the user.

12 Claims, 7 Drawing Sheets

(56) References Cited

U.S. PATENT DOCUMENTS

| | | | |
|---|---|---|---|
| 2009/0089277 A1 | 4/2009 | Cheslow | |
| 2009/0094223 A1* | 4/2009 | Berk et al. | 707/5 |
| 2009/0094234 A1* | 4/2009 | Marvit et al. | 707/5 |

OTHER PUBLICATIONS

Steven M. Beitzel, "On Understanding and Classifying Web Queries," Chicago, Illinois, May 2006, Submitted in partial fulfillment of the requirements for the degree of Doctor of Philosophy in Computer Science in the Graduate College of the Illinois Institute of Technology, 95 pp.

Bill Kules, "Helping Users Understand Search Results with Categorized Overviews," wmk@cs.umd.edu, Human-Computer Interaction Lab/University of Maryland, Apr. 9, 2009, 5 pp, http://www.cs.umd.edu/hcil/categorizedsearch/#description.

Hao Chen, School of Information Management & Systems, University of California, Berkeley, CA 94720 USA, hchen@sims.berkeley.edu and Susan Dumais, Microsoft Research, One Microsoft Way, Redmond, WA 99802 USSSA, sdumais@microsoft.com, "Bringing Order to the Web: Automatically Categorizing Search Results," Jun. 16, 2009, 9 pp, http://research.microsoft.com/en-us/um/people/sdumais/chi00.pdf.

Bill Kules, Jack Kustanowitz, and Ben Shneiderman, Human-Computer Interaction Lab and Department of Computer Science, University of Maryland, College Park, MD 20742 {wmk,kustan,ben}@cs.umd.edu, "Categorizing Web Search Results into Meaningful and Stable Categories Using Fast-Feature Techniques," 10 pp, Jun. 16, 2009, http://hcil.cs.umd.edu/trs/2006-15/2006-15.pdf.

Susan Dumais and Edward Cutrell, Microsoft Research, One Microsoft Way, Redmond, WA 98052, {sdumais|cutrell}@microsoft.com, and Hao Chen, Computer Science Division, University of California, Berkeley, CA 94720-1776, hchen@cs.berkeley.edu, "Optimizing Search by Showing Results in Context," 8 pp, Jun. 16, 2009, http://research.microsoft.com/en-us/um/people/sdumais/chi2001.pdf.

Dawn J. Lawrie and W. Bruce Croft, Department of Computer Science, University of Massachusetts, Amherst, MA 01003, "Generating Hierarchical Summaries for Web Searches," Copyright is held by the author/owner, SIGIR '03, Jul. 28-Aug. 1, 2003, Toronto, Canada, ACM 0-89791-88-6/97/05, 8 pp. Jun. 16, 2009, http://www.cs.loyola.edu/-lawrie/papers/ir-271.pdf.

Chemaxon, "List and Query Management," 9 pp, Apr. 9, 2009, http://www.chemaxon.com/instantjchem/ijc_latest/docs/user/help/htmlfiles/managing_data/queries/managing_queries.html.

* cited by examiner

MODEL-BASED SEARCHING

CROSS-REFERENCE TO RELATED APPLICATIONS

This application claims priority to U.S. Provisional Patent Application No. 61/177,250 filed May 11, 2009 the disclosure of which is hereby incorporated herein by reference.

BACKGROUND

Search engines utilize many methods and techniques to provide a user with the most valuable user experience possible. Such techniques include organizing search results in a way that provides the most relevant results near the top of a list of search results such that a user can quickly find a desired result. Another technique is to provide filters that can be selected by a user for application to a group of search results. Such filters sort the search results by context, file types, or subject matter, just to name a few. Additional filters may also be provided to further narrow a group of filtered search results.

The provision of these filters is often done by presenting links within a search results page or in a search results listing that a user may select to have a given filter applied. These links typically append one or more additional search terms to the original search query string to parse the search query a second time based on the additional search terms and to return a new set of search results.

SUMMARY

Embodiments of the invention generally relate to computer-readable media and computer-implemented methods for model-based searching to provide semantically relevant search results for a given search query. A model is created that provides a search framework by which a group of searches, or a "multiple search," is generated. The search framework includes a number of search query strings that have fields into which search terms and attributes are inserted. The search terms are provided by a user via a search engine. A topic or category for a user's search query is identified based on the search terms provided by the user. Each topic includes a number of attributes and terms corresponding thereto. The multiple search is run for the user's search query and the search results obtained are sorted based on the model and the attributes for the topic.

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the invention are described in detail below with reference to the attached drawing figures, wherein.

DETAILED DESCRIPTION

Figure 1:
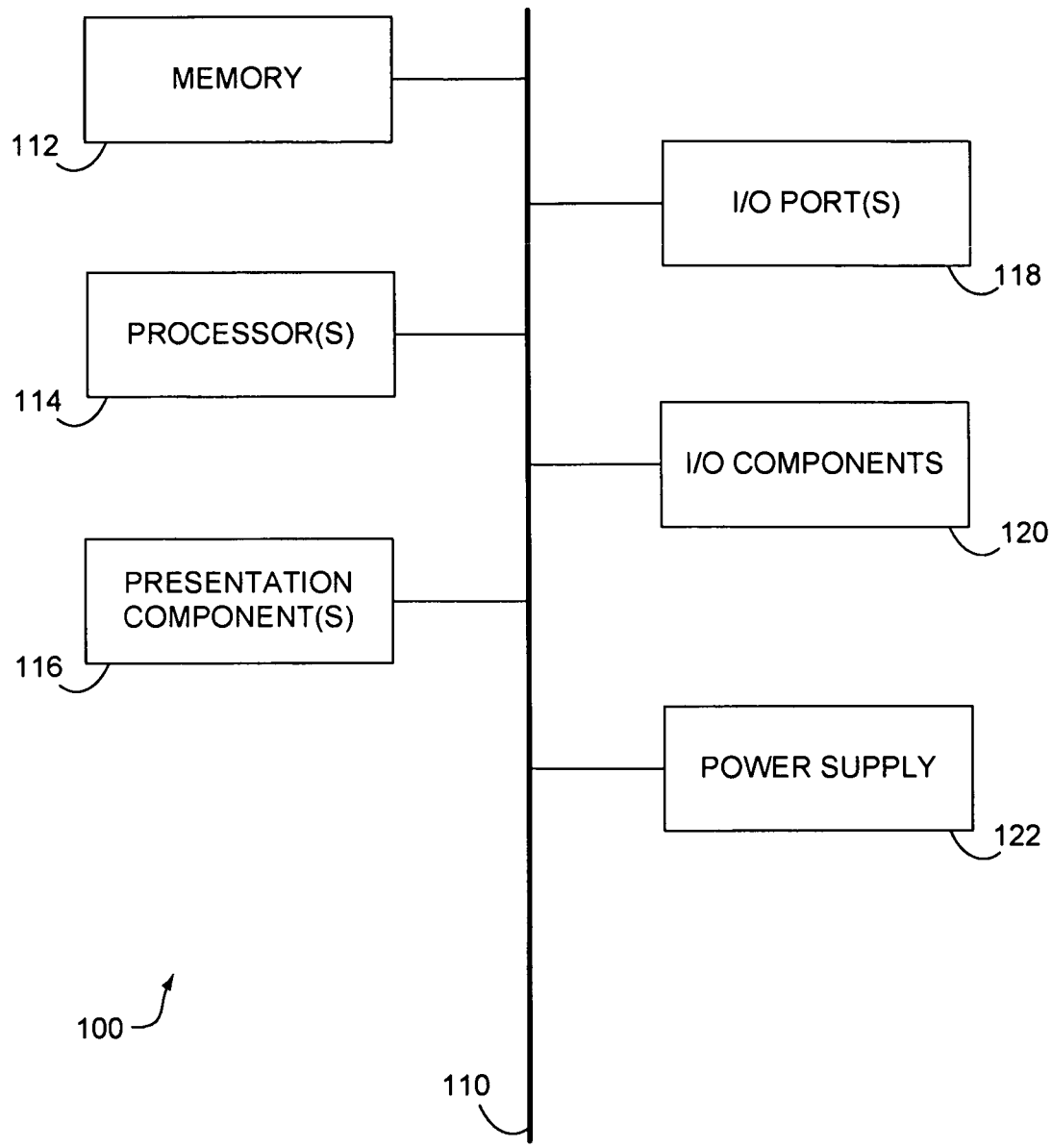
FIG. 1 is a block diagram of an exemplary computing device suitable for use in implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention provide computer-readable media and methods for model-based searching to provide semantically relevant search results. In a first embodiment, computer-readable media having computer-executable instructions embodied thereon that, when executed, perform a method for model-based searching to provide semantically relevant search results is described. A model that indicates a search framework for a search topic is provided. The search framework includes search queries that are executable by a computing device via a search engine. The search queries include fields in which a search term or an attribute are inserted. The search topic includes attributes that describe the search topic. A search term that indicates the search topic is received. The computing device executes the search queries via the search engine to obtain search results for the search topic based on the search term and the attributes of the search topic. The search term and the attributes inform the search queries.

In another embodiment, a computer-implemented method for model-based searching to provide semantically relevant search results is described. A first search query that includes a search term that corresponds to a predefined category is received at a computing device. The predefined category includes an attribute that is descriptive of the predefined category. A model that is indicated by the search term of the first search query and that is useable to instruct generation and execution of second search queries is identified via the computing device. The second search queries are generated via the computing device based on the model and using the search term and the attribute that describes the predefined category. The search term is combined with the attribute and operators to generate the plurality of second search queries. The second search queries based on the model are executed to obtain a search result.

In another embodiment, computer-readable media having computer-executable instructions embodied thereon that, when executed, perform a method for model-based searching to provide semantically relevant search results is described. A model that describes a search framework for a search topic is provided. The search framework indicates model-based search queries that are executable by a computing device via search engines. The model-based search queries include fields in which to insert a search term and an attribute. The search term is indicative of the search topic and the attribute is descriptive of the search topic. The model-based search queries for said search topic are compiled via a computing device. The search term and the attribute are inserted into the fields in each of the model-based search queries to generate a search string for each of the model-based search queries. The model-based search queries are executed via the computing device using the search strings to obtain search results. At least a portion of the search results is cached in a computer memory. A search query containing the search term that indicates the search topic is received from a user at a computing device. The portion of search results that is cached in the computer memory is retrieved. The portion of the search results is organized based on the model. The portion of the search results that is organized based on the model is presented to the user.

Figure 7:
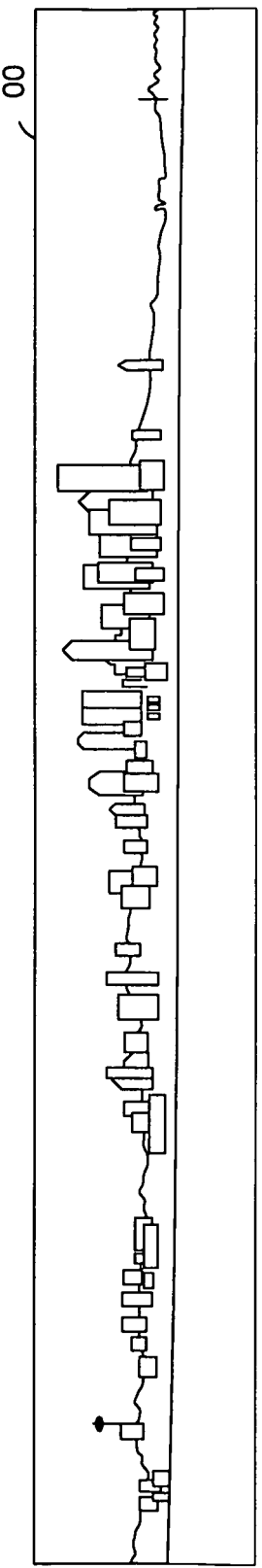
FIG. 7 is an illustrative image depicting an instant answer search result, in accordance with an embodiment of the invention.

The search results obtained in embodiments of the invention include links to websites, images, videos, audio files, advertisements, or any other search result content known in the art now or in the future. The search results may also include one or more instant answers (as depicted in FIG. 7) that are embedded in a search results page and provide content and information for a search topic on the search results page. One or more of the search results might also include attributes or descriptors of the search result or of the search topic, as are more fully described below. Further, the search results are obtained from searches of the Internet, an intranet, or any other public or private network.

Model-based searching employs a predefined model, or search framework by which a plurality of individual searches are generated and executed. A model includes a series, list, or other grouping of search query strings that have open fields, variables, and/or operators (e.g. predicates, list operators, set operators, logic operators, and/or lookup operators, among others). The open fields and variables are filled with data elements and values corresponding to a given search topic upon compiling the model for the given search topic. In embodiments, the open fields are bound to search topic attributes, input search query terms, user-context values (described below), and/or system-wide context values (e.g. meta-context) such as time, date, average query performance, and network traffic metrics, among other system-wide characteristics or values. The data elements and values include search terms, variations of search terms, and attributes of the given topic (described below).

In embodiments of the invention, the models are created by administrators that identify search strings that provide relevant and/or desirable search results. The models may also be created via a computing device executing algorithms to analyze search query string configurations and the search results that are obtained therefrom. Such analysis may include statistical calculations and relevance analysis of the search results, among others. Additionally, models may be generated by users or by a combination of administrators, computer algorithms, and users. Further, the models are fine-tuned or updated by administrators, computer algorithms, and users by utilizing data gathered from use of the model and interaction of users with the obtained search results, or by identifying additional or refined search query strings to be added to or changed in the model.

The search query strings include one or more open fields or variables, as described above, that are joined by one or more operators. An operator includes any functional language or symbol that operates to identify a relationship between the open fields and variables and/or to guide execution of a search query. Operators include, for example and not limitation, Boolean operators such as "AND," "OR," "NOT," and "IF . . . , THEN" as well as notations designating sets, lists, and their relationships, among others. Such operators indicate a relationship between the open fields and variables by which a given search query string should be executed. The operators might also indicate a preference or weight to be applied to a field or variable.

The search query strings of the compiled model, having the open fields and variables filled, are executed to obtain search results. This execution uses one or more search engines to search a plurality of websites, servers, and other content providers to obtain content indicated by the search query strings.

The models, and search query strings provided thereby, are utilized to search for content related to a search topic. A search topic includes any subject, topic, or category of subjects or topics that is searchable via the Internet or other network described above. Thus, a search topic includes a broad category, a subcategory within a broad category, or a specific subject in both a broad category and subcategory. For example, a broad category might be "music," a subcategory might be "musical groups or bands," and a specific subject might be a specific band. In an embodiment, a broad category is referred to as a "gallery" and subcategories therein are referred to as topics. Additionally, a search topic can belong to more than one broader category and can include one or more subcategories or specific subjects.

Further, search topics include one or more attributes that include one or more data elements or values. Attributes are categories of information that are descriptive of aspects of a search topic and the data elements and values describe those aspects of the search topic. For example, the search topic of the specific music band "U2" might include attributes such as "home town," "home state," "home country," "music genre," "active," and "music websites," among others. The data elements for a given attribute include words, phrases, website addresses or uniform resource locator (URL) addresses, or any other data or information useable to inform a model. The values for a given attribute include any numeric or logical value useable to inform a model. As such, data elements for the attribute "music genre" might include "rock," "pop," or "alternative," among others, and the attribute "active" might have a value of "true" because the band is currently still together and producing or playing music events.

Attributes are provided as literal strings or can be calculated from analysis a group of attributes, search results, or other available information. Exemplary attributes include, for example and not limitation: Boolean flags indicating properties of an attribute or search topic such as whether a person is alive or deceased; statistically calculated values such as relevance or customer satisfaction metrics for a search query or for a search topic; classifications of a search topic into one or more categories; and flags that indicate whether various identified terms occur in query logs along with a given search topic or search term, among others.

Additionally, an attribute may be included that describes search terms that indicate the search topic such that when a user enters one or more of the search terms in a search query the search topic and a corresponding model can be identified. Thus, search results are provided based on the search topic and corresponding model rather than based just on the user's entered search terms. Further, such an attribute identifies search term variants for the user-entered search term that are also searched via the model. As such, alternate or variations of terms are searched to provide a more inclusive search. For example, when a user enters the search terms "Jennifer Lopez" the additional search term variant "J-Lo," which is a nickname for the singer Jennifer Lopez, is also searched via the model.

As a further aid in identifying an appropriate search topic and model, grammar-based recognition schemes might be used. Where a user enters more than one search term, grammar-based recognition employs one or more of the search terms as modifiers or adjectives for other of the search terms in order to more precisely identify the user's intended search topic. For example, a search query including the search terms "U2 songs" might be split into "U2" and "songs", where "songs" is employed as a modifier of "U2." As such, the confidence level in a determination that the user is searching for songs by the musical group U2 is increased. Thus, search results for the musical group U2 are identified, preferred, or promoted while search results for the U2 spy plane are demoted.

An infinite number of search topics are possible. As such, in embodiments of the invention, a finite number of the most popular search topics are identified. For each identified topic a set of attributes are identified and data elements and values are provided for those attributes. The search topics and their attributes are identified by administrators and/or one or more computer applications or algorithms. In an embodiment, attributes for a given topic are selected based on a schema. Attributes may be identified on a topic-by-topic basis or a group of topics may be provided with a similar set of attributes. For example, a group of topics comprising specific music groups are each provided with a similar set of attributes and each topic's attributes provided with data elements and values specific to the specific music group.

Each search topic is also joined to one or more models. In an embodiment, the one or more models to which a search topic is joined is indicated by an attribute for the search topic. The models to which a search topic is joined are selected to provide the most relevant search results for the search topic. For example, a model may be configured to obtain informational search results such as encyclopedic information, while another model may be configured to obtain commercial search results such as sales or retailer information. The models may be combined to provide a blended or mixed set of search results from each type of model to a user. In an embodiment, the models and search results are blended automatically by the computing system or are configured by an administrator.

Referring now to the figures generally and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention may be described in the context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, input/output (I/O) components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to a "computing device."

The computing device 100 typically includes a variety of computer-readable media. By way of example, and not limitation, computer-readable media may comprise Random Access Memory (RAM); Read-Only Memory (ROM); Electronically Erasable Programmable Read-Only Memory (EEPROM); flash memory or other memory technologies; Compact-disk Read-Only Memory (CDROM), Digital Versatile Disks (DVD) or other optical or holographic media; magnetic cassettes, magnetic tape, magnetic disk storage or other magnetic storage devices, or any other medium that can be used to encode desired information and be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
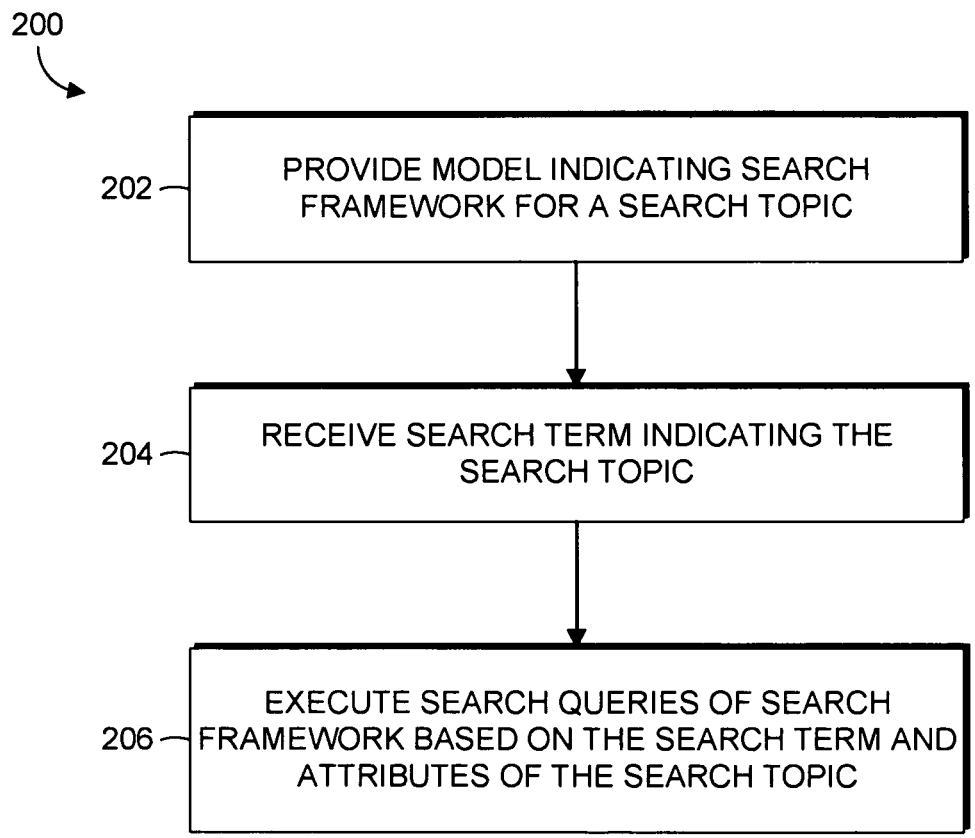
FIG. 2 is a flow diagram depicting a method for model-based searching to provide semantically relevant search results, in accordance with an embodiment of the invention.

With reference now to FIG. 2, a flow diagram depicting a method 200 for model-based searching to provide semantically relevant search results in accordance with an embodiment of the invention is described. Initially, a model that indicates a search framework for a search topic is provided, as indicated at 202. The search topic is tied to the model as described above and includes a number of attributes and data elements and values describing the attributes. The model provides the search framework from which a plurality of search queries are generated by inserting one or more of the attribute data elements and values, as well as search terms, into open fields therein.

At 204, a search term that indicates a search topic is received. The search term indicates a search topic via inclusion of the search term in a list of data elements describing a "search term" attribute for the search topic. In an embodiment, a listing of search terms, separate from the attributes of search topics, is employed to identify corresponding search topics.

The search term is received from a user via a search engine. The search term is used to identify a search topic and thereby a corresponding model. More than one model may be identified. The search term and attribute data elements and values of the search topic are employed to inform, or fill in open fields of the search framework of the model. The search queries of the search framework are then executed to obtain search results, as indicated at 206.

In another embodiment, the search term is provided by an administrator or is generated by an algorithm or application operating on a computing device. As such, the search results that are obtained are cached, or saved, at least temporarily, in a computer memory for later use. All of the search results may be cached, or only a portion of the search results may be cached. In an embodiment, caching of the search results includes caching of at least a portion of their respective web pages. Thus, when the search term is received from a user at a future time, the plurality of searches for the search topic indicated by the search term do not all need to be re-executed. Those searches for which search results have been cached are not re-executed and their corresponding search results are merely retrieved from the computer memory. Any searches that have not had their search results cached are re-executed at runtime. The cached search results may be periodically updated by re-executing the corresponding search queries.

By caching at least a portion of the search results for a given search topic, the performance of the search appears to a user to be high, because the speed at which the cached search results can be retrieved is greater than that with which each of the plurality of search queries can be executed. Thus, a user may receive the benefits of the execution of the plurality of searches without encountering derogatory effects on performance of the search.

The model also provides organization of the obtained search results for a given search topic and may utilize attributes and attribute data elements and values to aid in the organization. In an embodiment, the search results are organized into one or more categories that allow a user to pivot or refine their search based on the category. The categories are identified in the model and/or are identified by one or more of the search topic's attributes. Additionally, the data elements and values of the search topic attributes may determine whether a given category is provided or not. For example, the search topic of "George Washington" might include an attribute describing whether the subject of the search topic, George Washington, is alive or deceased. Further, the model may utilize the value of such an attribute to determine whether to provide a category of search results for "upcoming appearances" or to provide a category for "monuments."

The organization of the search results within each of the categories is also determined based on the model. The model indicates how the search results are ranked such as by providing weight or preference to some search results over others based on one or more criteria. One or more rules might also be included in the model to instruct organization of the search results. In an embodiment, list operators such as "split," "join," and "enumerate," set operations such as "union," "intersection," and "difference," as well as weighted blending techniques, among other techniques may be used to organize and sort the search results. The model may also indicate a layout or inclusion of specific features to be presented to a user. For example, a general overall search results page may be provided to a user that includes a predetermined number of search results from each search topic or model identified for a user's search terms blended together in a single display of search results. Alternatively, any number of search results from one or more identified search topics or models may be provided to a user based on administrator configuration, or analysis and algorithms executed by a computing system.

In an embodiment, models are arbitrated according to policies which govern who or what can modify a given model and to what extent. For example, an administrator is given full rights to modify a model in any manner, while a user may only be permitted to supply additional attributes or data items therefore. Policies are enforceable at the time of model design, at the time of compilation of the model, at runtime, or at any other time in the lifecycle of a model. Policies might determine when and how a model is to be analyzed and refreshed based on factors such as age, usage, or performance of the model.

Figure 3:
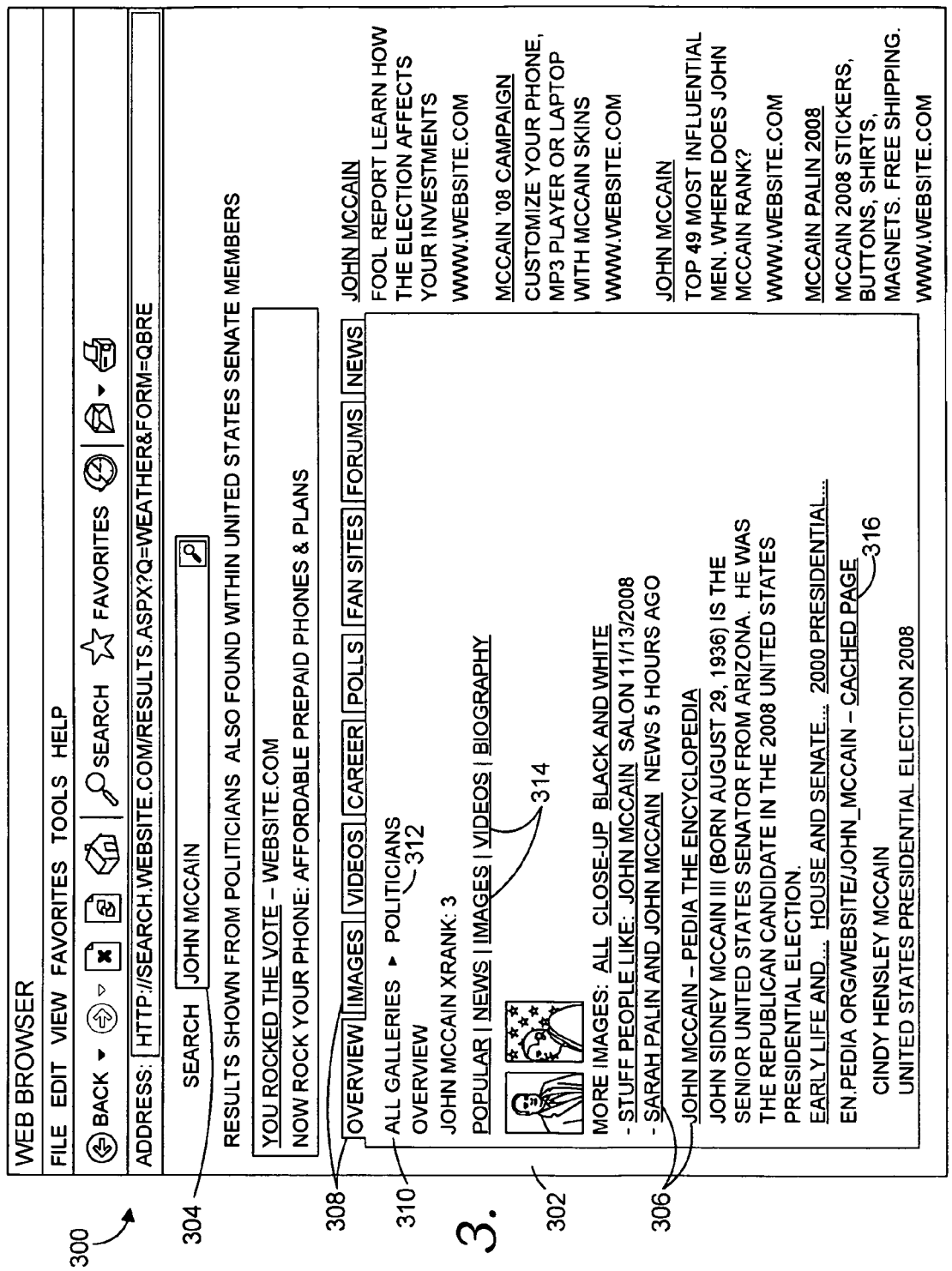
FIG. 3 is an illustrative image depicting a web browser displaying search results, in accordance with an embodiment of the invention.
Figure 4:
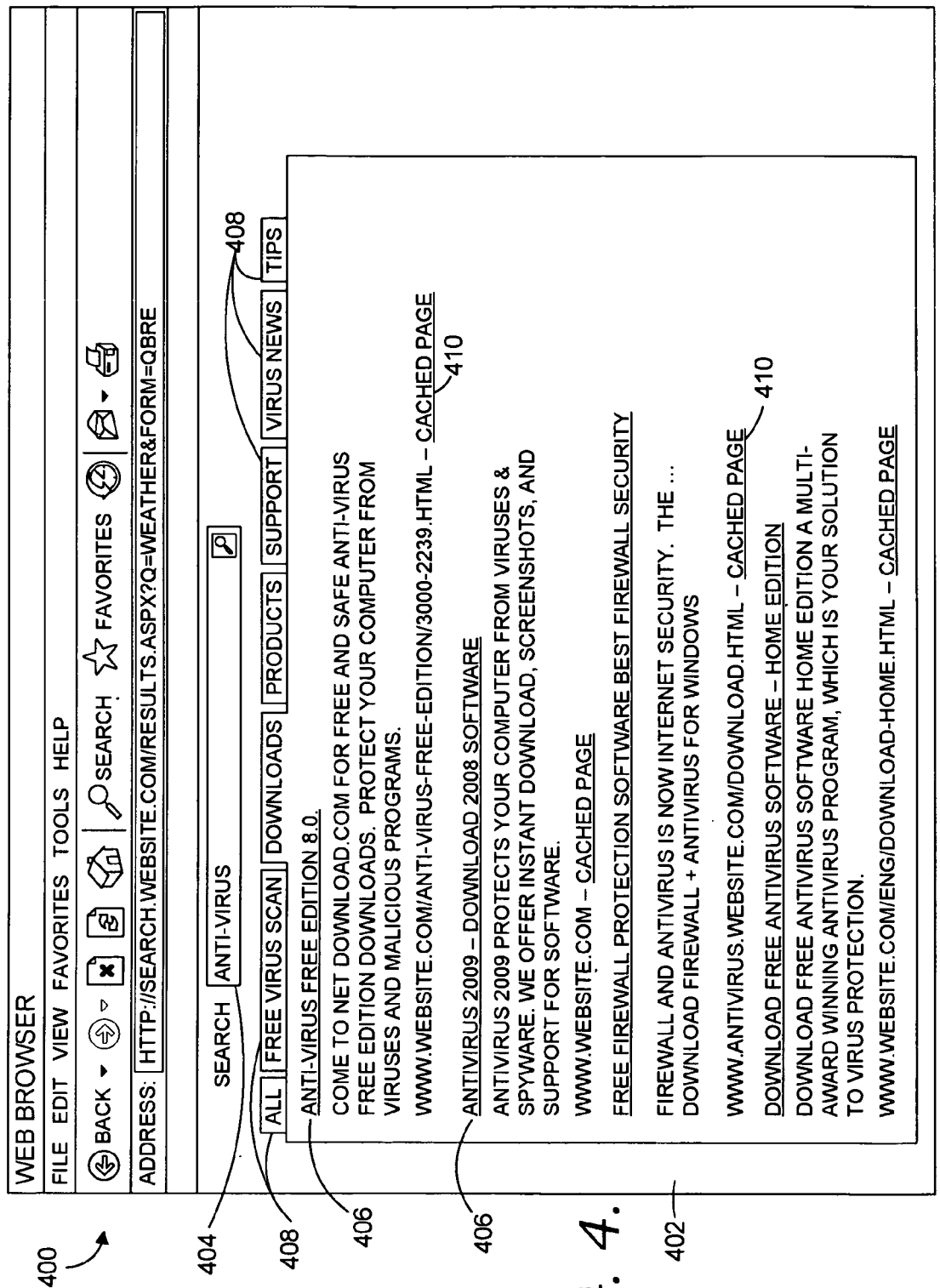
FIG. 4 is an illustrative image depicting a web browser displaying search results, in accordance with an embodiment of the invention.

With additional reference to FIGS. 3 and 4, illustrative images depicting the presentation of search results in accordance with embodiments of the invention are provided. FIGS. 3 and 4 are provided for illustrative purposes and are not intended to limit the scope of the invention. It is understood that are many other ways to present the search results other than those depicted in FIGS. 3 and 4 without departing from the scope of the invention. Such other presentations are understood as disclosed herein.

FIG. 3 depicts a web browser window 300 displaying a search results webpage 302. The search results webpage 302 includes a search field 304 displaying the search terms "John McCain" and a number of search results 306. The search results webpage 302 also displays a plurality of tabs 308 indicating categories or pivots under which the search results are organized. Further, a link 310 to galleries or broader categories in which the search topic is included, as well as an indication 312 of a category currently being viewed, are also displayed. One or more filters are also provided via links 314 which allow a user to filter the search results based on one or more criteria as is known in the art. In addition, a cached page indication 316 is provided on the search results webpage 302 to inform a user that a webpage associated with the corresponding search result 306 is cached in a computer memory. Such may be advantageous to a user because a cached webpage may load much more quickly than a non-cached webpage that must be retrieved from its original source.

As such, a user is provided with a set of search results that are obtained from a plurality of search queries and that are organized based on a model. The user can further refine or pivot their search by selecting a tab 308. The user is then presented with search results related to a category designated for the tab 308 and organized therein to provide the most relevant search results of the search topic and selected category.

FIG. 4 depicts another web browser window 400 depicting a search results window 402 generated for a search based on the search term "anti-virus." The search results window 402 includes a search field 404, search results 406, a plurality of tabs 408 that provide pivots for the search results, and a cached page indicator 410, as described above with respect to FIG. 3. The tabs 408 display categories that are identified based on a model and that are relevant to the search topic corresponding to the search terms "anti-virus." As such, some of the categories provided on the tabs 408 are different from those provided on tabs 308 which are generated based on a different model and search topic.

Figure 5:
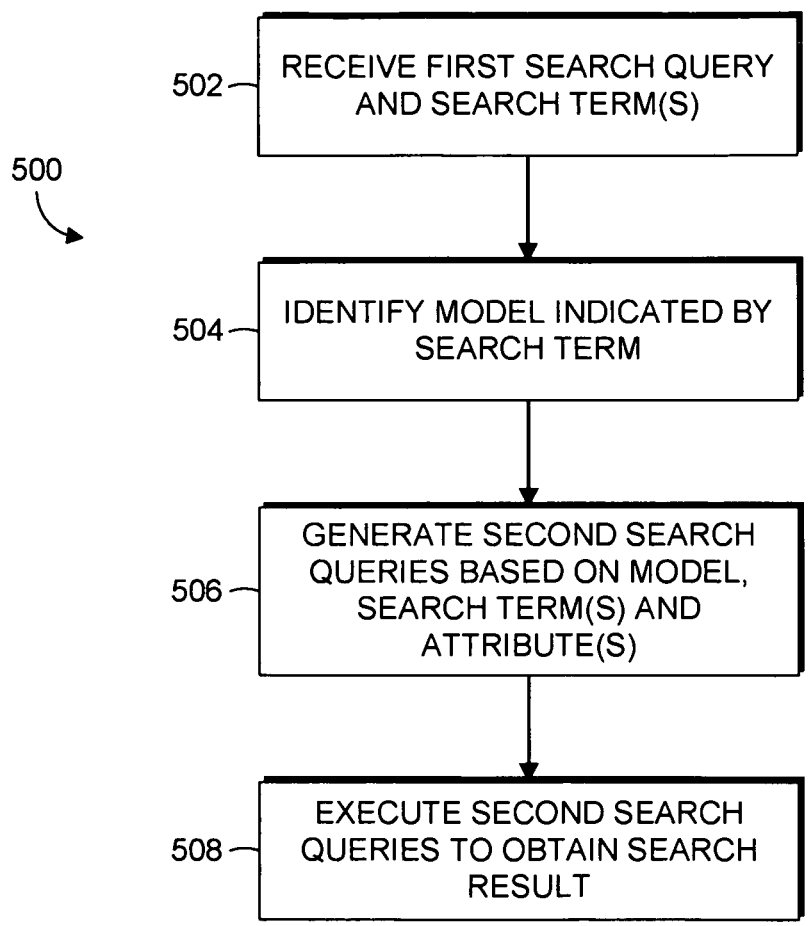
FIG. 5 is a flow diagram depicting a method for model-based searching to provide semantically relevant search results, in accordance with an embodiment of the invention.

With reference now to FIG. 5, a flow diagram depicting a method 500 for model-based searching to provide semantically relevant search results in accordance with an embodiment of the invention is described. At 502, a first search query and one or more search terms are received from a user via a search engine. The search terms are used to identify a search topic or predefined category for the user's search by locating one or more of the search terms in a listing of search terms for a given search topic. One or more models to which the search topic is tied are also identified, as indicated at 504. Where more than one model is tied to the search topic, the search terms are utilized to determine which of the models are to be used.

At 506, a plurality of second search queries is generated from the search framework of the model(s) by inserting one or more of the search terms and attribute data elements and values of the search topic into the open fields of the search queries in the search framework. The search queries are then executed to obtain search results, as indicated at 508. As such, a multiple search is executed for the single search query provided by the user. In other words, the user's single search query is not parsed directly, but rather a plurality of search queries generated from the model and based on a search topic identified from the user's search query are executed. Thus, a more inclusive set of search results are obtained for the user's search query than might be found if the user's search query were directly parsed. In another embodiment, the user's search query is directly parsed and the user's search terms are also used, as described above, to execute a multiple search via one or more identified models. In yet another embodiment, one or more of the search queries generated from the model is itself model-driven and thus, utilizes one or more additional models to generate and parse the search query or queries.

Figure 6:
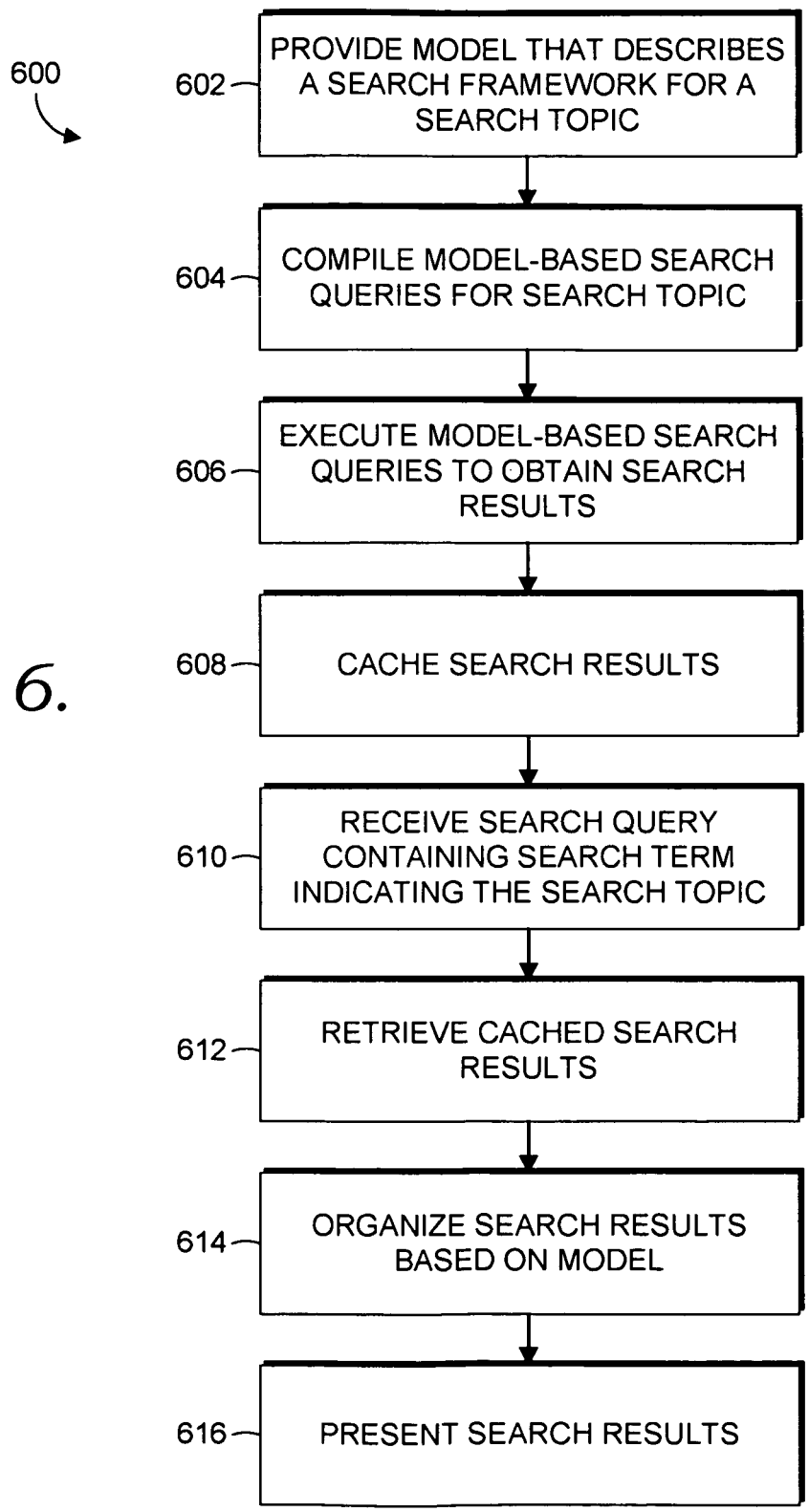
FIG. 6 is flow diagram depicting a method for model-based searching to provide semantically relevant search results, in accordance with an embodiment of the invention.

Referring now to FIG. 6, a flow diagram depicting a method 600 for model-based searching to provide semantically relevant search results, in accordance with an embodiment of the invention, is described. Initially, a model that describes a search framework for one or more search topics is provided, as indicated at 602. Models are designed to be useable with a variety of different search topics such that the models are portable between search topics and to minimize the number of models that must be created. Alternatively, models are also designed for application to specific groups or individual search topics.

A specific search topic that has a number of attributes and attribute data elements and values describing those attributes is selected. One or more search terms are also identified by an administrator or via an algorithm or application operating on a computing device that correspond to the specific search topic. The model is then compiled by inserting one or more of the attributes, attribute data elements, values, and search terms into open fields of the search query framework of the model, as indicated at 604. The open fields of the search framework may indicate specific attributes, attribute data elements, or values that are to be inserted therein.

The compilation of the search framework of the model provides a list or group of search queries that are executable via a search engine to obtain search results from a plurality of sources. In an embodiment, more than one search engine is utilized to execute the search queries. At 606, the search queries are executed to obtain search results. The search results are then cached in a computer memory, as indicated at 608. In an embodiment, only a portion of the search results are cached or none of the search results are cached.

In another embodiment, one or more search results are obtained that include additional attributes, attribute data elements, or values. Such a search result might include a search result that is obtained from and/or purchased from a third party source. For example, attribute data is obtained via a licensed, structured data feed from a third party web publisher. The additional attributes, attribute data elements, and values are used to further inform the model and thus, are inserted into one or more of the open fields of the search framework to generate additional search queries for execution. The additional search results obtained based on the additional attributes are combined with any other obtained search results and may be cached in the computer memory for later use. The additional attributes, attribute data elements, and values are also useable to inform the model's organization of the search results.

At 610, a search query is received from a user via a search engine. The user's search query includes one or more search terms that correspond to the search topic for which search results were obtained in step 606 above. One or more user-context data may also be provided with the user's search query. User-context data includes information about the user and the user's search history or browser history. Such information includes demographics, preferences, previously executed searches, and previously visited websites, among others. The user-context data is useable to further inform the model and search framework. Thus, one or more additional search queries are compiled using the user-context information and additional search results obtained therefrom. The user-context data is also useable as an aid in determining the confidence level of a search result. For example, where user provides the search term "Springfield" and user-context data is provided indicating that the user is located in Springfield, Mo., the confidence level of search results for Springfield, Mo. is increased over those for other cities named Springfield or for other search results for musical groups, movies, books, or businesses having the term "Springfield" in their title/name. The additional search queries are executed at runtime or may be cached in a computer memory. The user-context data is also useable to inform the model's organization of the search results.

The previously obtained and cached search results are retrieved from the computer memory, as indicated at 612. Any search results that were not cached may also be obtained by executing corresponding search queries. In embodiments of the invention, it is beneficial to cache the search results in memory in order to increase the speed at which the search results are retrieved and presented to a user. Without caching, the execution of the plurality of search queries provided by the search framework of the model may be too slow to meet expectations of a user and therefore, may decrease a user's interest and value received in using the model for searching. However, search results that result from user-context data obtained at runtime or that are related to current events or changing information, for example, may not be possible to obtain prior to receiving the user's search query. Thus, it may not be possible to cache such search results prior to runtime. Search queries for obtaining those search results are executed at runtime. Combining cached search results with search results obtained at runtime decreases any deleterious effects of executing search queries at runtime by leveraging the advantages obtained by using the cached search results.

The search results are organized based on the model, as indicated at 614, and are presented to the user, as indicated at 616 and as depicted in FIGS. 3 and 4. In an embodiment, the organization of the search results and any resulting search results webpages are also at least partially cached in a computer memory to further increase performance. The user may then select a desired search result, as is known in the art, or may select a tab, such as the tab 308 of FIG. 3, to pivot the search based on a selected subcategory.

In another embodiment, the search terms of the user's search query are ambiguous or correspond to more than one search topic. In such an instance, a weight or preference is provided for each search topic to identify the most popular of the group of search topics corresponding to the search terms. The most popular search topic is utilized to provide search results to the user. In addition, user-context data may be used to increase the weight or preference given to a search topic. Alternatively, a search results webpage is provided to allow a user to choose a specific search topic. Upon receiving the user's choice of search topic search results are provided for that search topic as described previously. By yet another alternative, search results for each of the corresponding search topics are provided to the user. The search results may be intermixed or may be organized via one or more tabs similar to the tabs 308 and 408 of FIGS. 3 and 4, respectively. One or more of the above alternatives might also be combined to identify a search topic for which to present search results.

In another embodiment, the search terms received in the user's search query do not correspond to any search topic. In such an instance, the user's search query is executed as a single search query, search results obtained, and the search results presented to the user as is known in the art.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. Computer-storage media having computer-executable instructions embodied thereon that, when executed, perform a method for model- based searching to provide semantically relevant search results, the method comprising:
   providing a model that describes a search framework that is useable with each of a plurality of predefined search topics, the search framework including a plurality of model-based search queries that are executable by a computing device via one or more search engines, the plurality of model-based search queries being predefined and including one or more fields in which to insert one or more search terms and one or more search-term attributes, the one or more search terms being included in a list of search terms that comprises at least one search-term attribute of the one or more search-term attributes for a search topic, and the at least one search-term attribute of the one or more search-term attributes being descriptive of the search topic;
   via the computing device, compiling the plurality of model-based search queries for the search topic by inserting the one or more search terms and the one or more search-term attributes into the one or more fields in each of the plurality of model-based search queries to generate a search string for each of the plurality of model-based search queries;
   via the computing device, executing the plurality of model-based search queries using the search strings to obtain a plurality of search results;
   caching at least a portion of the plurality of search results in a computer memory;
   receiving from a user, a search query containing the one or more search terms;
   via the computing device, retrieving the portion of the plurality of search results that are cached in the computer memory;
   receiving an additional search-term attribute that describes the search topic from a third party;
   compiling one or more additional model-based search queries by inserting the additional search-term attribute into one or more of the fields of one or more of model-based search queries of the plurality of model-based search queries; and
   executing the one or more additional model-based search queries to obtain an additional search result;
   organizing the portion of the plurality of search results and the additional search result based on the model, the model being useable with a plurality of categories, wherein the plurality of categories are based on the model; and
   presenting the portion of the plurality of search results and the additional search result that are organized based on the model to the user.

2. The computer-storage media of claim 1, further comprising:
   receiving one or more user-context data items from the user that describe one or more of the user's preferences, demographics, search history, and browser history; and
   executing one or more user-context search queries via the one or more search engines to obtain one or more user-context-search results for the search topic based on the one or more user-context data items, the one or more search terms, and the one or more search-term attributes.

3. The computer-storage media of claim 1, further comprising:
   receiving one or more user-context data items that describe one or more of a user' s preferences, demographics, search history, and browser history; and
   identifying the model based at least partially on the one or more user-context data items, the one or more user-context data items indicating a search result type, and the model being configured to obtain the portion of the plurality of search results of the search result type indicated by the user-context data items.

4. The computer-storage media of claim 1, wherein the model is generated or updated by at least one of an administrator, a user, or one or more algorithms.

5. A method for model-based searching to provide semantically relevant search results, the method comprising:
   providing a model that describes a search framework that is useable with each of a plurality of predefined search topics, the search framework including a plurality of model-based search queries that are executable by a computing device via one or more search engines, the plurality of model-based search queries being predefined and including one or more fields in which to insert one or more search terms and one or more search-term attributes, the one or more search terms being included in a list of search terms that comprises at least one search-term attribute of the one or more search-term attributes for a search topic, and the at least one search-term attribute of the one or more search-term attributes being descriptive of the search topic;

compiling the plurality of model-based search queries for the search topic by inserting the one or more search terms and the one or more search-term attributes into the one or more fields in each of the plurality of model-based search queries to generate a search string for each of the plurality of model-based search queries;

executing the plurality of model-based search queries using the search strings to obtain a plurality of search results;

caching at least a portion of the plurality of search results in a computer memory;

receiving from a user, a search query containing the one or more search terms;

retrieving the portion of the plurality of search results that are cached in the computer memory;

receiving an additional search-term attribute that describes the search topic from a third party;

compiling one or more additional model-based search queries by inserting the additional search-term attribute into one or more of the fields of one or more model-based search queries of the plurality of model-based search queries; and executing the one or more additional model-based search queries to obtain an additional search result;

organizing the portion of the plurality of search results and the additional search result based on the model, the model being useable with a plurality of categories, wherein the plurality of categories are based on the model; and presenting the portion of the plurality of search results and the additional search result that are organized based on the model to the user.

6. The method of 5, further comprising:

receiving one or more user-context data items that describe one or more of a user's preferences, demographics, search history, and browser history; and identifying the model based at least partially on the one or more user-context data items, the one or more user-context data items indicating a search result type, and the model being configured to obtain the portion of the plurality of search results of the search results type indicated by the user-context data items.

7. The method of claim 5, further comprising:

receiving one or more user-context data items that describe one or more of a user's preferences, demographics, search history, and browser history; and executing one or more user-context search queries via the one or more search engines to obtain one or more user-context search results for the search topic based on the one or more user-context data items, the one or more search terms, and the one or more search-term attributes.

8. The method of claim 5, wherein the model is generated or updated by at least one of an administrator, a user, or one or more algorithms.

9. A system for performing a method for model-based searching to provide semantically relevant search results, the system comprising:

a processor coupled to a memory that retains computer-executable instructions, wherein the processor executes a method comprising:

providing a model that describes a search framework that is useable with each of a plurality of predefined search topics, the search framework including a plurality of model-based search queries that are executable by a computing device via one or more search engines, the plurality of model-based search queries being predefined and including one or more fields in which to insert one or more search terms and one or more search-term attributes, the one or more search terms being included in a list of search terms that comprise at least one search-term attribute of the one or more search-term attributes for a search topic, and the at least one search-term attribute of the one or more search-term attributes being descriptive of the search topic;

compiling the plurality of model-based search queries for the search topic by inserting the one or more search terms and the one or more search-term attributes into the one or more fields in each of the plurality of model-based search queries to generate a search string for each of the plurality of model-based search queries;

executing the plurality of model-based search queries using the search strings to obtain a plurality of search results;

caching at least a portion of the plurality of search results in a computer memory;

receiving from a user at a computing device, a search query containing the one or more search terms;

retrieving the portion of the plurality of search results that are cached in the computer memory;

receiving an additional search-term attribute that describes the search topic from a third party;

compiling one or more additional model-based search queries by inserting the additional search-term attribute into one or more of the fields of one or more model-based search queries of the plurality of model-based search queries; and executing the one or more additional model-based search queries to obtain an additional search result;

organizing the portion of the plurality of search results and the additional search result based on the model, the model being useable with a plurality of categories, wherein the plurality of categories are based on the model; and presenting the portion of the plurality of search results and the additional search result that are organized based on the model to the user.

10. The system of claim 9, the method further comprises:

receiving one or more user-context data items that describe one or more of a user's preferences, demographics, search history, and browser history; and identifying the model based at least partially on the one or more user-context data items, the one or more user-context data items indicating a search result type, and the model being configured to obtain the portion of the plurality of search results of the search result type indicated by the user-context data items.

11. The system of claim 9, the method further comprising:

receiving one or more user-context data items that describe one or more of a user's preferences, demographics, search history, and browser history; and executing one or more user-context-search queries via the one or more search engines to obtain one or more user-context search results for the search topic based on the one or more use-context data items, the one or more search terms, and the one or more search-term attributes.

12. The system of claim 9, wherein the model is generated or updated by at least one of an administrator, a user, or one or more algorithms.

* * * * *